(12) United States Patent
Udagawa et al.

(10) Patent No.: US 8,146,691 B2
(45) Date of Patent: Apr. 3, 2012

(54) TRAVEL DRIVE SYSTEM FOR WORK VEHICLE, WORK VEHICLE, AND TRAVEL DRIVE METHOD

(75) Inventors: Tsutomu Udagawa, Tsukuba (JP); Akira Nakayama, Tsuchiura (JP); Tsukasa Toyooka, Omitama (JP); Makoto Sugaya, Narita (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 323 days.

(21) Appl. No.: 12/517,435

(22) PCT Filed: Nov. 28, 2007

(86) PCT No.: PCT/JP2007/072949
§ 371 (c)(1),
(2), (4) Date: Jun. 3, 2009

(87) PCT Pub. No.: WO2008/069072
PCT Pub. Date: Jun. 12, 2008

(65) Prior Publication Data
US 2010/0032219 A1    Feb. 11, 2010

(30) Foreign Application Priority Data
Dec. 4, 2006    (JP) .................................. 2006-326694

(51) Int. Cl.
*B60W 10/00*    (2006.01)
(52) U.S. Cl. ................. 180/65.285; 180/65.28; 180/307; 180/308
(58) Field of Classification Search ............. 180/65.265, 180/65.28, 307, 308
See application file for complete search history.

(56) References Cited

U.S. PATENT DOCUMENTS

| | | | | |
|---|---|---|---|---|
| 4,886,142 A | * | 12/1989 | Yamaoka et al. | 180/242 |
| 6,860,354 B2 | * | 3/2005 | Hasegawa | 180/242 |
| 6,932,179 B2 | * | 8/2005 | Sakikawa et al. | 180/242 |
| 7,076,954 B1 | | 7/2006 | Sopko, Jr. et al. | |
| 7,331,412 B2 | * | 2/2008 | Irikura | 180/6.3 |
| 7,407,030 B2 | * | 8/2008 | Yasuda et al. | 180/305 |

(Continued)

FOREIGN PATENT DOCUMENTS
DE    35 01 608 A1    7/1986
(Continued)

OTHER PUBLICATIONS

International Search Report dated Jan. 8, 2008 including English translation (Five (5) pages).
(Continued)

*Primary Examiner* — Toan To
(74) *Attorney, Agent, or Firm* — Crowell & Moring LLP

(57) ABSTRACT

A travel drive system for a work vehicle includes: an HST drive device comprising a hydraulic pump driven by a prime mover and a hydraulic motor connected to the hydraulic pump by a closed circuit; an electric motor driven by using electric power generated by drive of the prime mover; a first drive wheel driven by the HST drive device; a second drive wheel driven by the electric motor; a vehicle speed detector that detects a vehicle speed; and a control unit that distributes output of the prime mover to the HST drive device and to the electric motor such that, as the vehicle speed detected by the vehicle speed detector increases, a proportion of a first power distributed to the HST drive device decreases and a proportion of a second power distributed to the electric motor increases.

16 Claims, 9 Drawing Sheets

U.S. PATENT DOCUMENTS

| | | | |
|---|---|---|---|
| 7,431,122 B2 * | 10/2008 | Iwaki et al. | 180/305 |
| 7,455,130 B2 * | 11/2008 | Irikura | 180/6.48 |
| 7,694,765 B2 * | 4/2010 | Kitagawara et al. | 180/65.6 |
| 7,941,998 B2 * | 5/2011 | Nakano et al. | 60/437 |

FOREIGN PATENT DOCUMENTS

| | | |
|---|---|---|
| DE | 10 2004 005 673 A1 | 8/2005 |
| JP | 5-306768 A | 11/1993 |
| JP | 7-277020 | 10/1995 |
| JP | 2001-169608 A | 6/2001 |
| JP | 2004-350475 A | 12/2004 |
| JP | 2006-105305 A | 4/2006 |

OTHER PUBLICATIONS

The Extended European Search Report dated Mar. 24, 2011 (Five (5) pages).

* cited by examiner (a)

(b)

(a)

(b)

(c)

TRAVEL DRIVE SYSTEM FOR WORK VEHICLE, WORK VEHICLE, AND TRAVEL DRIVE METHOD

TECHNICAL FIELD

The present invention relates to a travel drive system for a work vehicle such as a wheel loader and a wheel hydraulic excavator, the work vehicle, and a travel drive method.

BACKGROUND ART

There is a travel drive system for this sort of work vehicles known in the related art, which includes a hydrostatic transmission (HST) travel circuit where a hydraulic pump is connected to a hydraulic motor by a closed circuit for transmitting a driving force by the hydraulic motor to wheels via a propeller shaft so as to allow the vehicle to be driven (refer to, for example, patent reference literature 1).

Patent reference literature 1: Japanese Laid Open Patent Publication No. H5-306768

DISCLOSURE OF THE INVENTION

Problems to Be Solved by the Invention

There has been a problem which results from characteristics of an HST, that is, even though the travel drive system exerts large tractive force during low-speed running, fuel consumption deteriorates due to a gear transmission loss during high-speed running.

Means for Solving the Problems

A travel drive system for a work vehicle according to the present invention comprises: an HST drive device comprising a hydraulic pump driven by a prime mover and a hydraulic motor connected to the hydraulic pump by a closed circuit; an electric motor driven by using electric power generated by drive of the prime mover; a first drive wheel driven by the HST drive device; a second drive wheel driven by the electric motor; a vehicle speed detector that detects a vehicle speed; and a control unit that distributes output of the prime mover to the HST drive device and to the electric motor such that, as the vehicle speed detected by the vehicle speed detector increases, a proportion of a first power distributed to the HST drive device decreases and a proportion of a second power distributed to the electric motor increases.

It is also possible to include, instead of the electric motor, a motor generator that functions as an electric motor when driven by using electric power generated by drive of the prime mover and that functions as a generator when driven by kinetic energy during traveling, and a determination unit that determines output of an acceleration/deceleration instruction for the vehicle; wherein the control unit, when it is determined with the determination unit that an acceleration instruction is output, allows the motor generator to function as an electric motor and distributes output of the prime mover to the HST drive device and the electric motor such that, as the vehicle speed detected by the vehicle speed detector increases, a proportion of a first power distributed to the HST drive device decreases while a proportion of a second power distributed to the motor generator increases, wherein the control unit, when it is determined with the determination unit that a deceleration instruction is output, allows the motor generator to function as a generator.

In this case, when it is determined with the determination unit that the deceleration instruction is output, the control unit may control the motor generator to generate more electricity as a deceleration instruction value is larger.

It is also possible to further comprises an acceleration detector that detects an acceleration instruction value, wherein the control unit distributes power of the prime mover to the HST drive device and the electric motor such that, as the acceleration instruction value is larger, the first power and the second power increase.

It is preferable that the first drive wheel is a front wheel, and the second drive wheel is a rear wheel.

It is also possible that the control unit controls the proportion of the first power to be constant and larger than the proportion of the second power in a range where the vehicle speed detected by the vehicle speed detector is equal to a first predetermined value or less; gradually decreases the proportion of the first power in a range where the vehicle speed detected by the vehicle speed detector is more than the first predetermined value and less than a second predetermined value which is larger than the first predetermined value; and sets the proportion of the first power to be zero in a range where the vehicle speed detected by the vehicle speed detection section is equal to the second predetermined value or more.

A gearing system that transmits power by the HST drive device to the first drive wheel may be further included.

A torque control unit may be further included that maintains output torque of the electric motor constant until tractive force by the HST drive device is reduced to zero and controls output torque of the electric motor such that tractive force by the electric motor starts decreasing after the tractive force by the HST drive device is reduced to zero by an increase in the vehicle speed.

A travel drive method for a work vehicle according to the present invention includes an HST drive device comprising a hydraulic pump driven by a prime mover and a hydraulic motor connected thereto by a closed circuit, drives a first wheel by the HST drive device; drives a second wheel by an electric motor; and as a vehicle speed increases, decreases a proportion of a first power to be distributed to the HST drive device, while increasing a proportion of a second power to be distributed to the electric motor.

Advantageous Effect of the Invention

According to the present invention, a HST drive device can be efficiently operated so as to increase fuel economy because a first drive wheel and a second drive wheel are driven by the HST drive device and an electric motor respectively and, as the detected vehicle speed increases, the proportion of output of the engine distributed to the HST drive device is reduced.

BEST MODE FOR CARRYING OUT THE INVENTION

First Embodiment

A travel drive system according to the first embodiment of the present invention is now described in reference to FIGS. 1 to 7.

Figure 1:
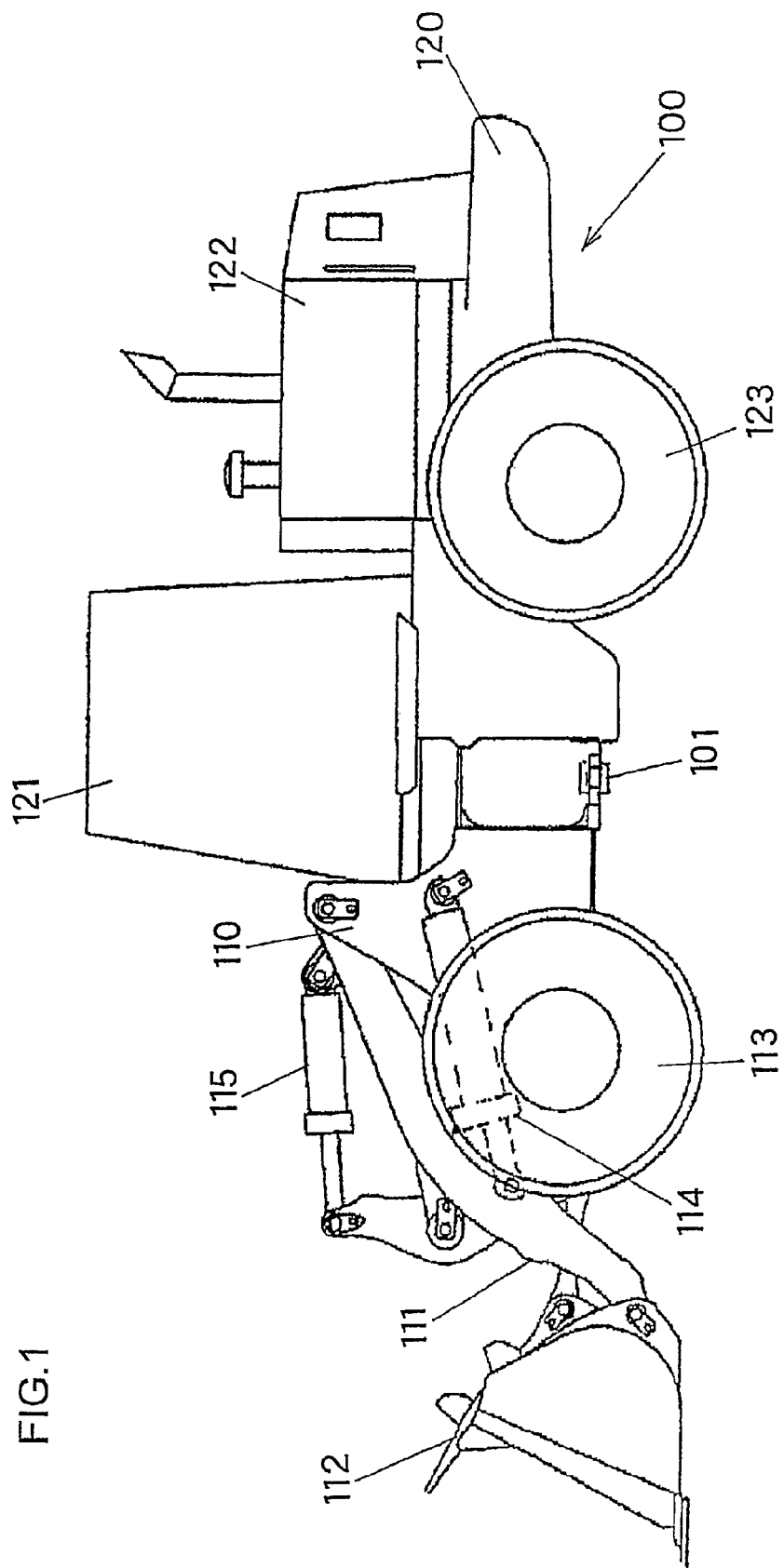
FIG. 1 shows a side view of a wheel loader to which a travel drive system in accordance with a first embodiment of the present invention is applied.

FIG. 1 is a side view of a wheel loader, an example of a work vehicle to which the travel drive system according to the first embodiment is applied. A wheel loader 100 includes a front body 110 which is provided with an arm 111, a bucket 112, front wheels 113, etc., and a rear body 120 which is provided with an operator's cab 121, an engine compartment 122, rear wheels 123, etc. The arm 111 is driven to elevate by an arm cylinder 114. The bucket 112 is driven to dump or crowd by a bucket cylinder 115. The front body 110 and the rear body 120 are rotatably connected with each other with a center pin 101. The front body 110 turns right and left relative to the rear body 120 by expansion and contraction of a steering cylinder (not shown herein). The front wheels 113 and the rear wheels 123 are driven by the travel drive system explained below for the vehicle to travel.

Figure 2:
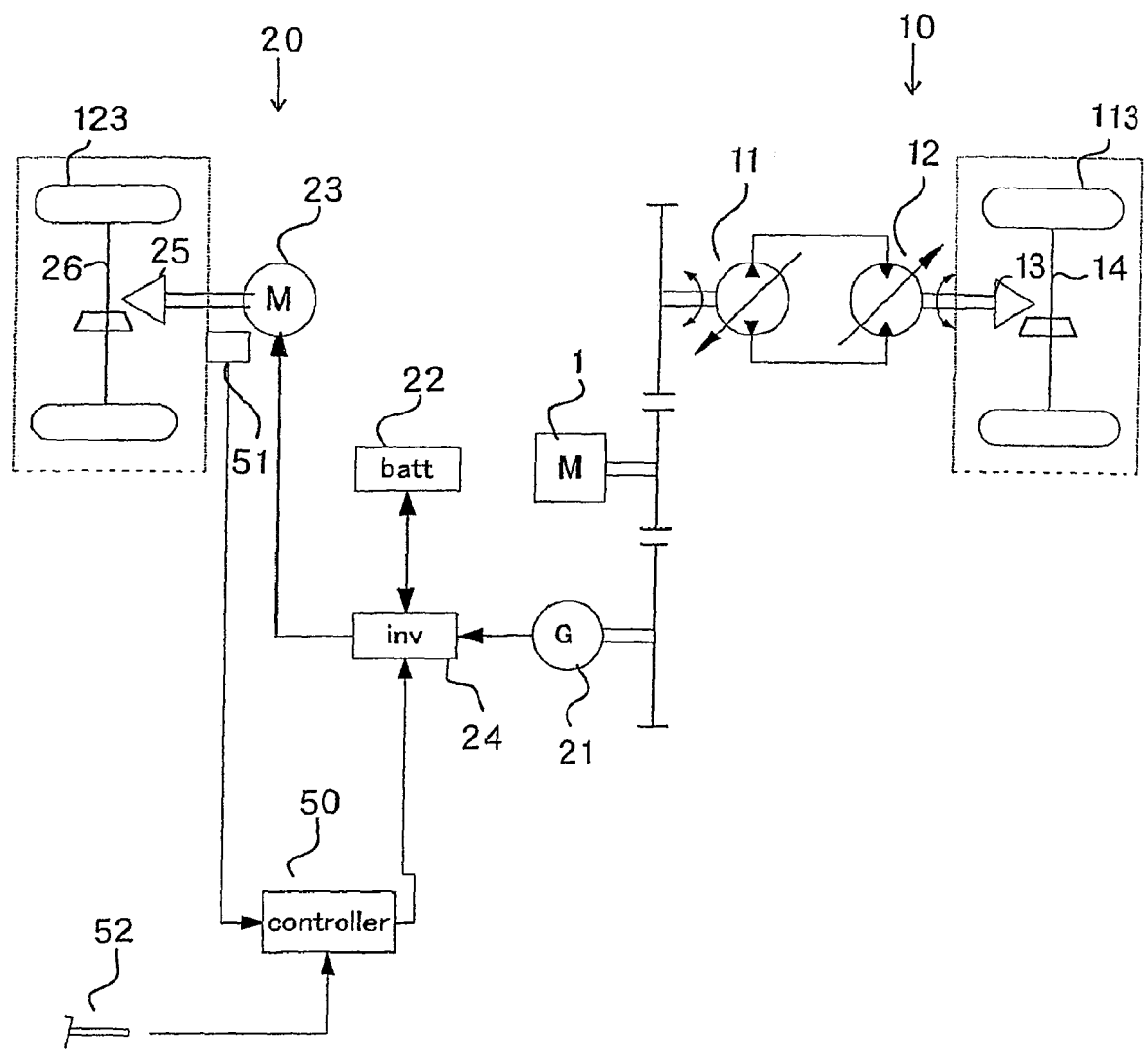
FIG. 2 shows a schematic diagram of the travel drive system in accordance with the first embodiment.

FIG. 2 is a schematic diagram of the travel drive system in accordance with the first embodiment. The travel drive system includes a front-wheel drive device 10 which drives the front wheels 113 and a rear-wheel drive device 20 which drives the rear wheels 123.

The front-wheel drive device 10 includes a variable displacement hydraulic pump 11 driven by an engine 1 and a variable displacement hydraulic motor 12 driven by pressure oil from the hydraulic pump 11. The hydraulic pump 11 and the hydraulic motor 12 are connected to each other by a closed circuit to make up a HST travel circuit. Rotation of the hydraulic motor 12 is transmitted to the front wheels 113 via a speed reducer 13 and an axle 14. The front wheels 113 are driven by the HST travel drive system. The speed reducer 13 includes a gearing system with a plurality of gears (for instance, a low gear and a high gear).

The HST travel drive system (to be called HST) exerts large tractive force when the vehicle is traveling at low speed. An axle and a propeller shaft need to be robustly designed corresponding to the large tractive force with the low gear. Size of shaft and gear thus tends to be larger. This causes a gear transmission loss and poor fuel efficiency when the vehicle travels at high speed with the high gear. In accordance with the present embodiment, the rear-wheel drive device 20 includes an electric motor which drives the rear wheels 123 when the vehicle travels at high speed.

The rear-wheel drive device 20 includes a generator 21, a battery 22 in which electricity generated by the generator 21 is stored, the electric motor 23 driven by the electric power generated by the generator 21, and an inverter 24 which controls the drive of the electric motor 23. Rotation of the electric motor 23 is transmitted to the rear wheels 123 via a speed reducer 25 and an axle 26. The rear wheels 123 are thus driven by the electric motor 23. The speed reducer 25, as the speed reducer 13, includes a gearing system with a plurality of gears (for instance, a low gear and a high gear).

The inverter 24 is controlled by a control signal from a controller 50. The controller 50 is connected with a vehicle speed detector 51 for detecting the vehicle speed v and a operation amount detector 52 for detecting an operation amount A of an accelerator pedal. The controller 50, as described hereinbelow, controls output torque T of the electric motor 23 according to a target output Pw2 (FIG. 6) of the motor 23 in response to signals from those detectors.

Figure 3:
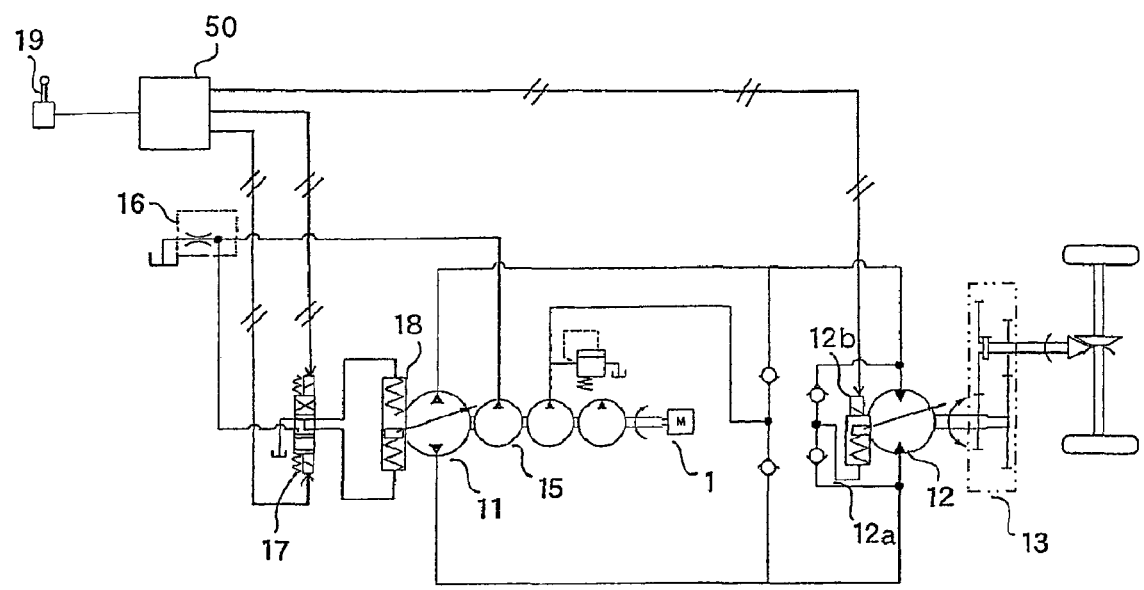
FIG. 3 shows a hydraulic circuit diagram of the HST travel circuit in FIG. 2.
Figure 4:
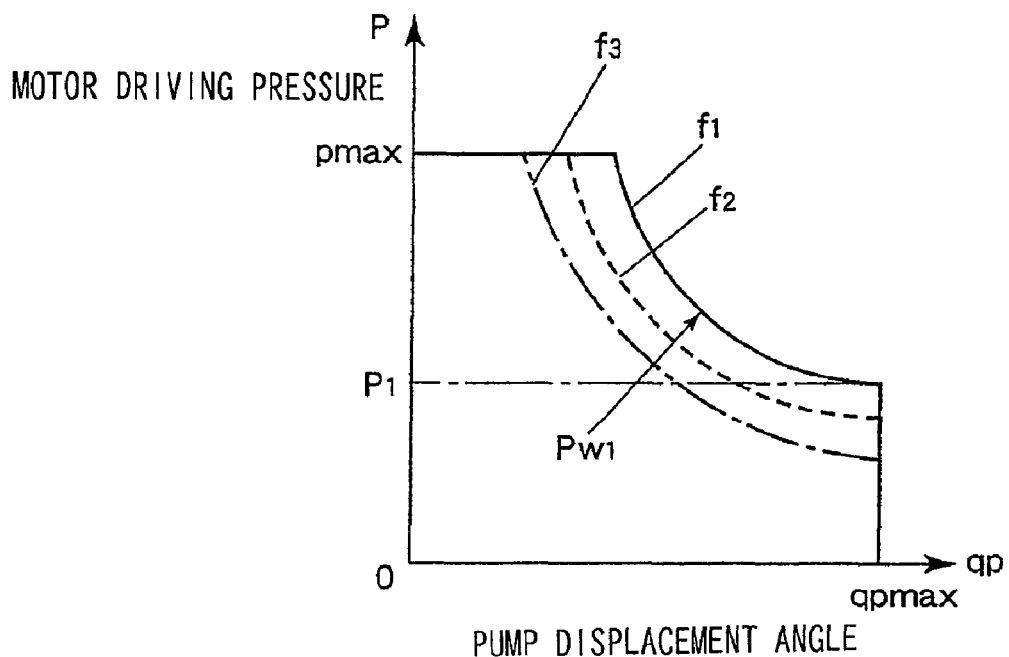
FIG. 4(a) shows the relationship between a displacement angle of a hydraulic pump and a motor driving pressure in the circuit in FIG. 3.
FIG. 4(b) shows the relationship between a displacement angle of the hydraulic motor and a motor driving pressure.
Figure 4:
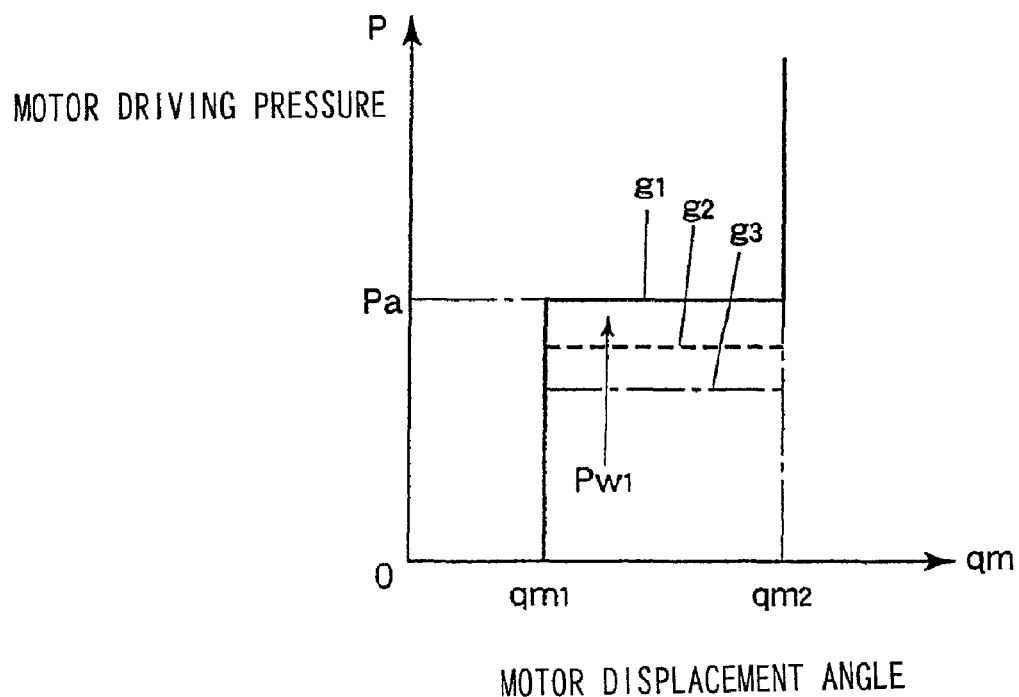

The front-wheel drive device 10 is now described in detail. FIG. 3 shows the HST travel circuit in detail. As shown in FIG. 3, a charge pump 15 is connected to an output shaft of the engine 1. A restrictor 16 is provided in the downstream of the charge pump 15. When the engine rotation speed is increased by depressing the accelerator pedal (not shown herein), discharge pressure of the charge pump 15 increases. Pressure oil from the charge pump 15 is brought to displacement cylinder 18 through a forward/reverse switching valve 17 and thence drives the displacement cylinder 18. In this configuration, as the engine rotational speed increases, a displacement angle up of the hydraulic pump 11 increases so that a pump discharge rate increases to increase a rotation speed of the hydraulic motor 12. The forward/reverse switching valve 17 is switched by a control signal from the controller 50 in response to an operation of a forward/reverse switching lever 19 and accordingly, direction of the pressure oil from the hydraulic pump 11 to the hydraulic motor 12 is controlled.

The pump displacement angle qp is changed not only according to a depression of the accelerator pedal but also depending on load on the hydraulic pump 11. As a traveling load increases while, for example, the accelerator pedal is depressed to the maximum extent and output of the engine 1 is maximum, the engine rotational speed slows down, thence the pump displacement angle decreases and the pump discharge rate decreases. The relationship between the load (motor driving pressure P) and the pump displacement angle qp in this case is as shown in FIG. 4(a). In FIG. 4(a), each of characteristics f1 to f3 indicates a horsepower curve with the same power. As a power Pw1 (FIG. 6) which is distributed to the HST decreases, the horsepower curve shifts in order from f1, f2, to f3. The maximum value Pmax of the motor driving pressure is limited by a relief valve which is not shown herein. The maximum value qpmax of the pump displacement angle is physically limited by the structure of the pump itself.

In FIG. 3, the driving pressure P for the hydraulic motor 12 is brought to a displacement cylinder 12a, and therefore the motor displacement angle qm is changed depending on the motor driving pressure P. In other words, when the motor driving pressure P exceeds a predetermined value Pa, the displacement cylinder 12a is driven to increase the displacement angle, and thence, as shown in FIG. 4(b), the motor displacement angle qm is changed from a minimum displacement angle qm1 to a maximum displacement angle qm2. The displacement cylinder 12a is provided with an adjustment mechanism for adjusting the predetermined value Pa by excitation of a solenoid 12b. The predetermined value Pa is controlled by a control signal from the controller 50 according to the target power Pw1. That is, as the target power Pw1 increases, the predetermined value Pa increases in order from characteristics g3, g2, to g1.

Each respective set of f1 to f3 in FIG. 4(a) and g1 to g3 in FIG. 4(b) is corresponding to the same power Pw1. When the power Pw1 is maximum, for example, the characteristics of the pump displacement angle qp is f1, and the characteristics of the motor displacement angle qm is g1. In this case, the predetermined value Pa is set to a value equal to the motor driving pressure P1 at the maximum pump displacement angle qpmax. As a traveling load increases while traveling with the power Pw1 of the HST maximum and with the minimum motor displacement angle qm1, the motor displacement angle qm first increases to qm2 along the characteristics g1, and then the pump displacement angle qp decreases along the characteristics f1.

FIGS. 5(a) through 5(c) show the relationships between the vehicle speed v and the driving force (tractive force) F. In FIG. 5(a), "a" indicates characteristics of the overall tractive force of vehicle when the accelerator pedal is fully depressed. The characteristics a shows the entire tractive force Fa of vehicle when the maximum power of the vehicle is exerted, that is, the full power of the engine 1 is output. The tractive force Fa decreases as the vehicle speed v increases. The power P of vehicle is expressed in P=F×v generally. Therefore, when the power P is maximum and constant, the tractive force Fa decreases as the vehicle speed v increases.

In FIG. 5(a), "b1" and "c1" indicate characteristics of the tractive force Fb of the front wheels 113 by the front-wheel drive device 10 (HST drive device) and the tractive force Fc of the rear wheels 123 by the rear-wheel drive device 20 (electric motor 23) respectively when the accelerator pedal is fully depressed. The sum of the characteristics b1 and c1 equals to the characteristics a. The characteristics of the tractive force Fb of the front wheels 113 and the characteristics of the tractive force Fc of the rear wheels 123 are set as shown in FIGS. 5(b) and 5(c) in the present embodiment. FIGS. 5(b) and 5(c) show a plurality of characteristics b1 to b3 and c1 to c3 each corresponding a different operation amount of accelerator pedal. As the operation amount of accelerator pedal increases, the characteristics of the tractive force Fb changes in order from b3, b2, to b1, while the characteristics of the tractive force Fc changes in order from c3, c2, to c1.

Both of the characteristics b1 and c1 are the characteristics achieved when the accelerator pedal is fully pressed on. When the accelerator pedal is fully depressed, as shown in FIG. 5(b), the tractive force Fb of the front wheels 113 stays constant until the vehicle speed reaches v1, thereafter gradually decreases, and eventually becomes 0 at the vehicle speed v2. On the other hand, as shown in FIG. 5(c), the tractive force Fc of the rear wheels 123 stays constant until the vehicle speed reaches v2, thereafter gradually decreases, and eventually becomes 0 at the vehicle speed v3. By setting the vehicle speed v2 achieved when the tractive force Fb is 0 to be equal to the vehicle speed of when the tractive force Fc starts decreasing, the overall tractive force Fa of vehicle decreases gradually as the vehicle speed increases, and therefore allows shock to be reduced.

Figure 5:
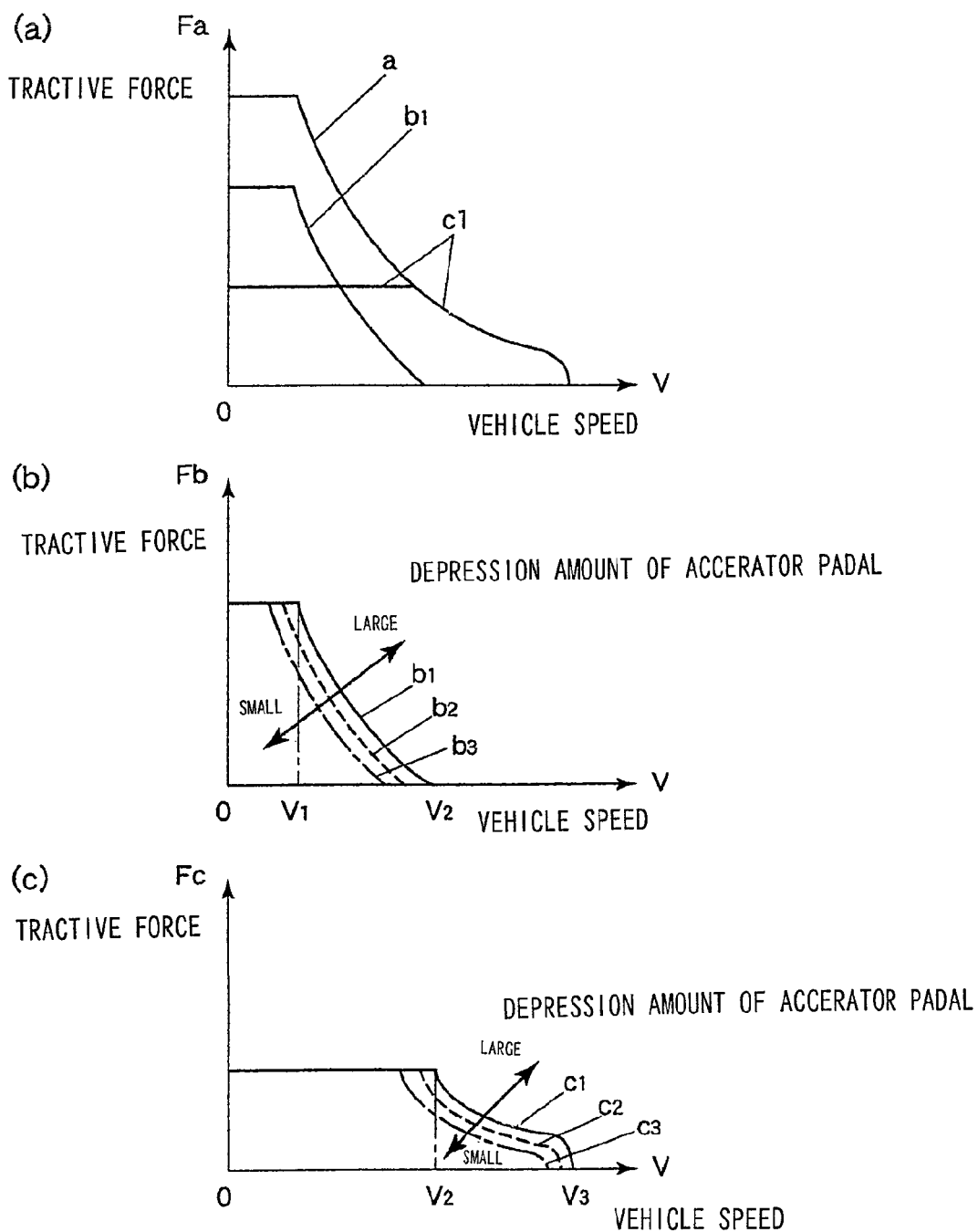
FIGS. 5(a) to 5(c) show characteristics of the overall tractive force by the vehicle, the tractive force by the HST drive device, and the tractive force by the electric motor, respectively, which are obtained by the travel drive system in accordance with the first embodiment.

According to the present embodiment, the output torque T of the electric motor 23 is controlled so as to allow the tractive force Fb of the front wheels 113 and the tractive force Fc of the rear wheels 123 to change along the characteristics shown in FIGS. 5 (b) and (c) respectively. Also, the predetermined value Pa in FIG. 4(b) is controlled. Further explanation is now given.

Figure 6:
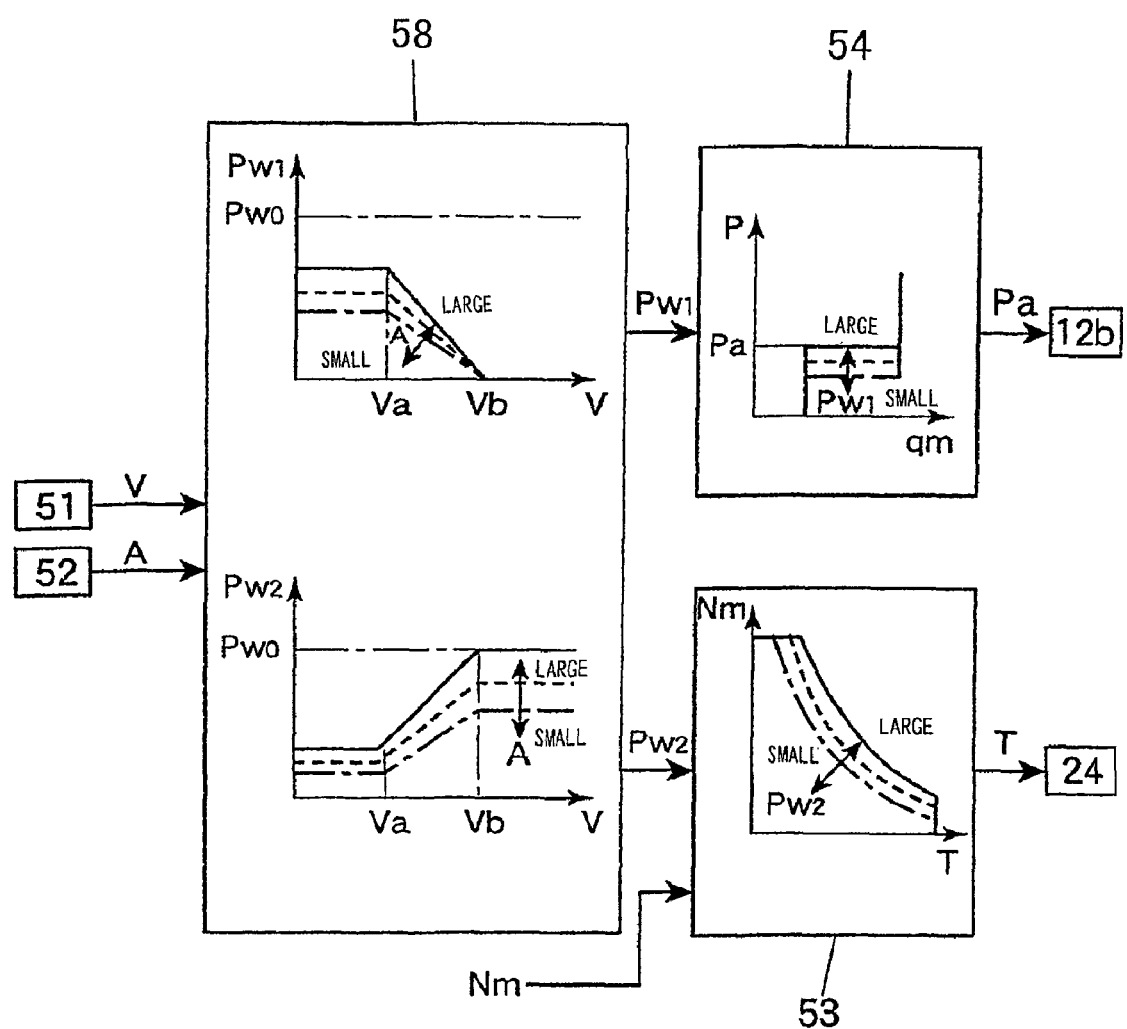
FIG. 6 shows a block diagram of the controller in FIG. 2.

FIG. 6 is a block diagram of the controller 50. In a target power operation unit 58, characteristics of the target power Pw1 of the HST drive device and characteristics of the target power Pw2 of the electric motor 23 are stored in advance. These characteristics show how engine output is distributed to the HST and to the electric motor 23 depending on the vehicle speed v. The sum Pw0 of Pw1 and Pw2 indicates overall power of vehicle. The power Pw0 stays constant regardless of the vehicle speed v. The engine output increases as the operation amount A of the accelerator pedal increases. Therefore, the target powers Pw1 and Pw2 are set larger as the operation amount A of the accelerator pedal is larger.

The target powers Pw1 and Pw2 are set according to the vehicle speed v. Specifically, in a low speed range of v≦va, the target power Pw1 of the HST is set larger than the target power Pw2 of the electric motor 23. In a medium speed range of va<v<vb, proportion of the target power Pw1 is set to gradually decrease, while that of the target power Pw2 is set to gradually increase. In a high speed range of v≧vb, the target power Pw1 is set to 0, while the target power Pw2 is set to be maximum (Pw0). Based on the set characteristics, the target power operation unit 58 computes the target powers Pw1 and Pw2 according to the vehicle speed v and the operation amount A of the accelerator pedal, and outputs the target powers Pw1 and Pw2 to a predetermined value operation unit 54 and a torque operation unit 53 respectively.

In the torque operation unit 53, the relationship between a target torque T of the electric motor 23, a rotational speed Nm of the motor 23 and the power Pw2 is stored in advance. The controller controls the current motor rotational speed Nm. Based on the characteristics shown in the figure, the torque operation unit 53 computes the target torque T according to the target power Pw2 and the motor rotational speed Nm, and controls the inverter 24 such that the electric motor 23 outputs the target torque T. The power Pw2 of the electric motor 23 thus takes the value as set by the target power operation unit 58.

A part of the engine output is thus used for the power Pw2 of the electric motor 23. The rest of the engine output is distributed to the HST. The power Pw1 of the HST becomes the target power Pw1 set by the target power operation unit 58. The predetermined value operation unit 54 is provided with the relationship between the target power Pw1 and the predetermined value Pa, which is stored in advance. Based on the relationship, the predetermined value operation unit 54 computes the predetermined value Pa according to the target power Pw1, and outputs a control signal to the solenoid 12b of the hydraulic motor 12. The predetermined value Pa is thus controlled.

Figure 7:
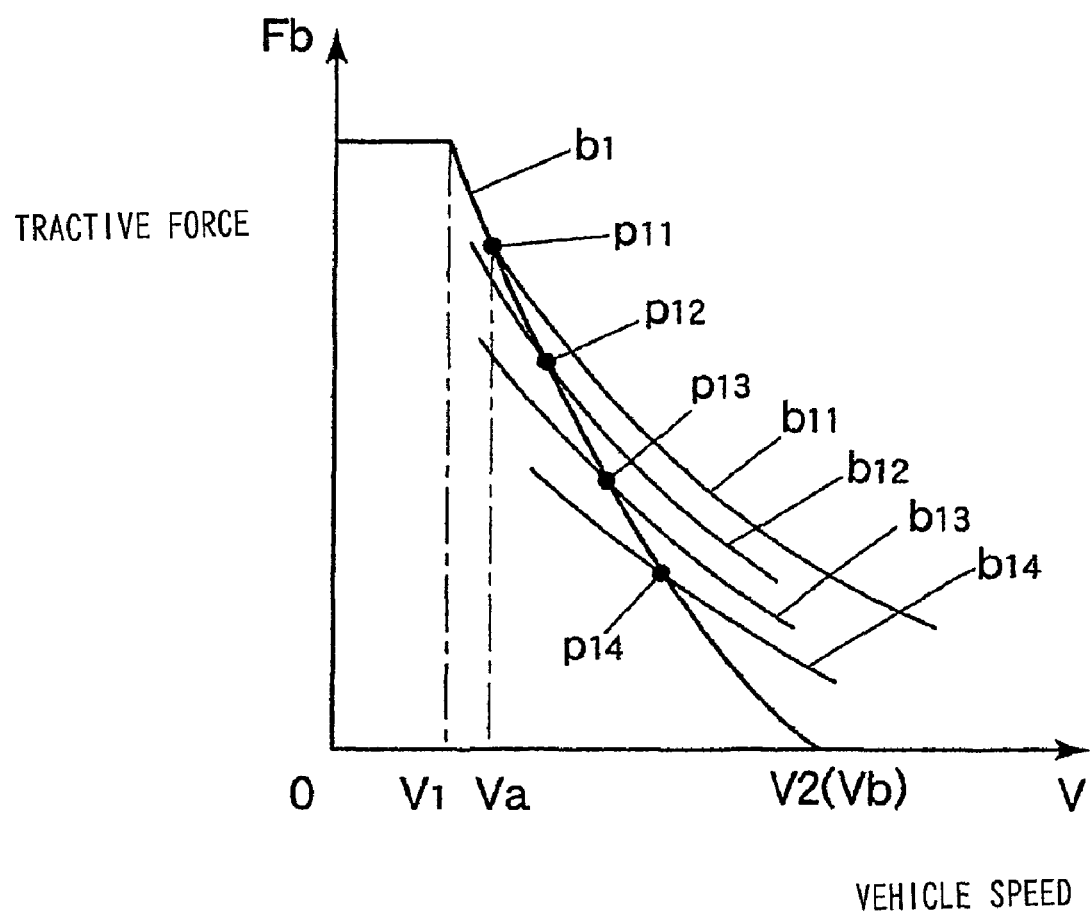
FIG. 7 shows the relationship between the tractive force and a power.

The relationship between the HST tractive force Fb in FIG. 5(b) and the HST target power Pw1 in FIG. 6 is now explained. FIG. 7 shows the relationship between the HST tractive force Fb and the HST target power Pw1, therein "b1" indicates the same characteristics as in FIG. 5(b). In FIG. 7, b11 to b14 are curves with a constant power, having the relationship of b11 >b12>b13>b14. Since the power Pw1 stays constant within the range of the vehicle speed v<va (FIG. 6), the tractive force Fb varies along the curve b11 with a constant power. Since the power Pw1 gradually decreases after the vehicle speed exceeds va, the tractive force Fb shifts from a point P11 on the curve b11 to a point P12 on the curve b12, thereafter to a point P13 on the curve b13, and eventually to a point P14 on the curve b14. As a result, the characteristics of the tractive force Fb in FIG. 5(b) is obtained from that of the power Pw1 in FIG. 6.

An example of an operation of the travel drive system in accordance with the first embodiment is now described.

If the accelerator pedal is fully depressed at startup of the vehicle, pressure oil is supplied from the hydraulic pump 11 to the hydraulic motor 12 and thence the front wheels 113 are driven by the HST. The electric motor 23 rotates in response to the signal from the inverter 24, and subsequently the rear wheels 123 are driven by the electric motor 23. The engine output is hereat distributed to both the HST and the electric motor 23. Before the vehicle speed v reaches the predetermined value va, as shown in FIG. 6, the power Pw1 to be distributed to the HST is larger than the power Pw2 to be distributed to the electric motor 23 (Pw1>Pw2). Thus, the HST works so effectively as to realize a traveling performance of large tractive force at low speed as shown in FIG. 5.

In the range where the vehicle speed v is equal to or larger than va and equal to or smaller than vb, as the vehicle speed v increases, the power Pw2 to be distributed to the electric motor 23 increases while the power Pw1 to be distributed to the HST decreases. After the vehicle speed v reaches vb(=v2) or more, it is achieved that Pw1=0 and the pump displacement angle qp 0. Thus, the tractive force Fb becomes 0, as shown in FIG. 5, and a traveling performance of low tractive force at high speed is realized. The vehicle is hereat driven only by the tractive force Fc of the electric motor 23. Since it is not necessary for the vehicle to run at high speed by the HST, power loss in the HST drive device at high speed is reduced to increase fuel economy thereof.

The following operational effects can be achieved in accordance with the first embodiment.

(1) The front wheels 113 and the rear wheels 123 are driven by the HST travel drive system and the electric motor 23, respectively. In the range where the vehicle speed v is equal to or larger than va and equal to or smaller than vb, the power Pw1 to be distributed to the HST decreases as the vehicle speed v increases. In the range where the vehicle speed v exceeds vb, Pw1 is set to be 0. At high speed with the vehicle speed v2 or more, only the tractive force Fc of the electric motor 23 affects on the vehicle, and therefore the power loss of the HST drive device decreases, resulting in improvement of fuel efficiency.

(2) Since the rear wheels 123 are driven by the electric motor 23, the large tractive force Fa of the vehicle as a whole can be obtained. In comparison with one that obtains the tractive force Fa only by the HST, therefore, the pump 11 and the motor 12 in the HST can be miniaturized more.

(3) The operation amount A of the accelerator pedal is to be detected by the operation amount detector 52. And, as the operation amount A increases, the power Pw1 of the HST and the power Pw2 of the electric motor 23 increase (FIG. 6). Therefore, the engine output can always be effectively distributed to the HST and the electric motor 23.

(4) The front wheels 113, which apply heavy load on the axle, are driven by the HST, while the rear wheels 123, which apply light load on the axle, are driven by the electric motor 23. Therefore, requiring less tractive force Fc of the electric motor 23, the optimal traveling system is achieved by the HST and the electric motor 23.

(5) When the distribution of the power Pw1 is changed according to the vehicle speed v, the pump displacement angle qp and the motor displacement angle qm are automatically optimized according to the power Ew1. Therefore, since it is not necessary for the controller 50 to directly control the displacement angles qp and qm, a simple configuration is realized thereof.

Second Embodiment

Figure 8:
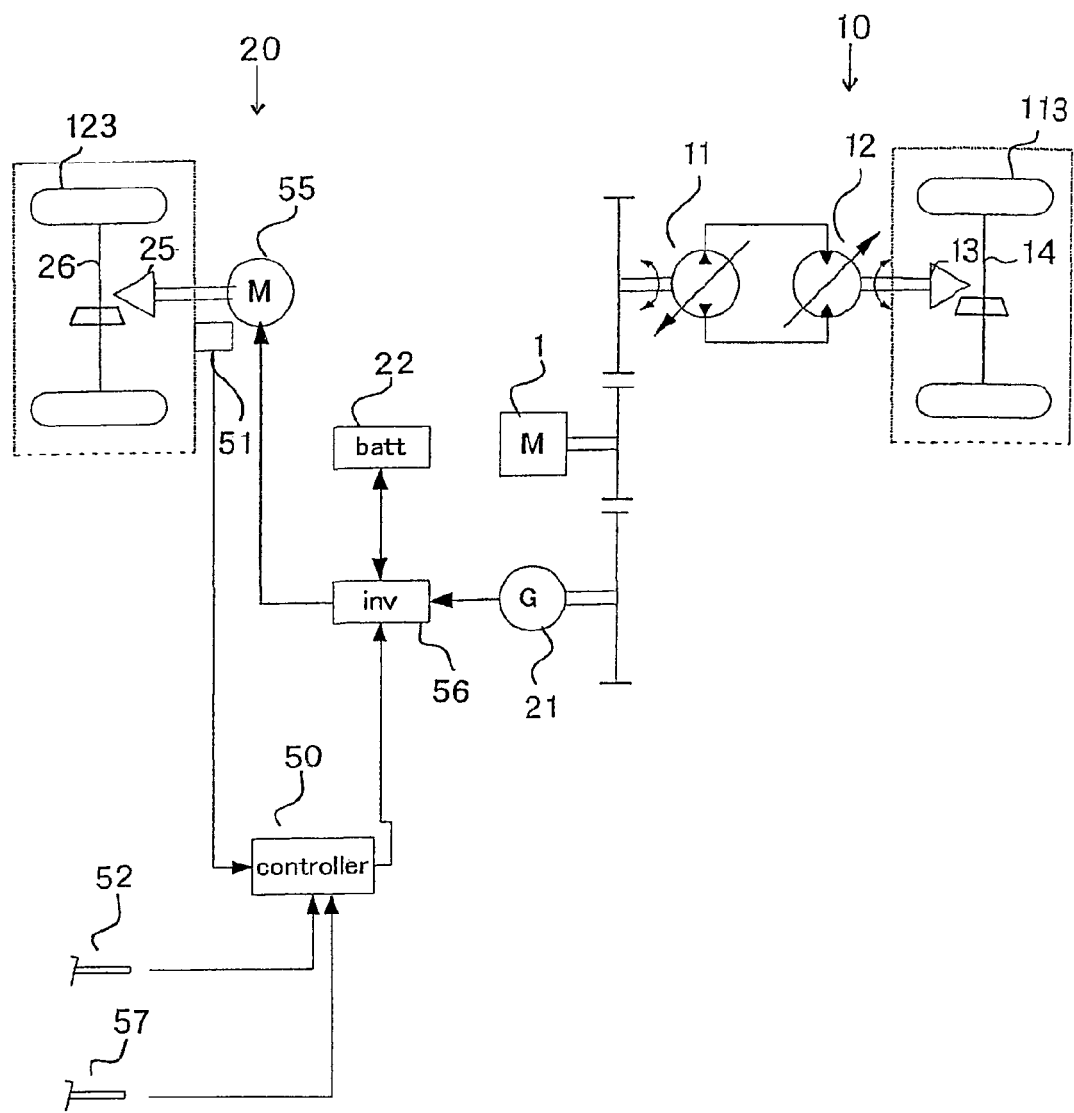
FIG. 8 shows a schematic diagram of the travel drive system in accordance with a second embodiment.
Figure 9:
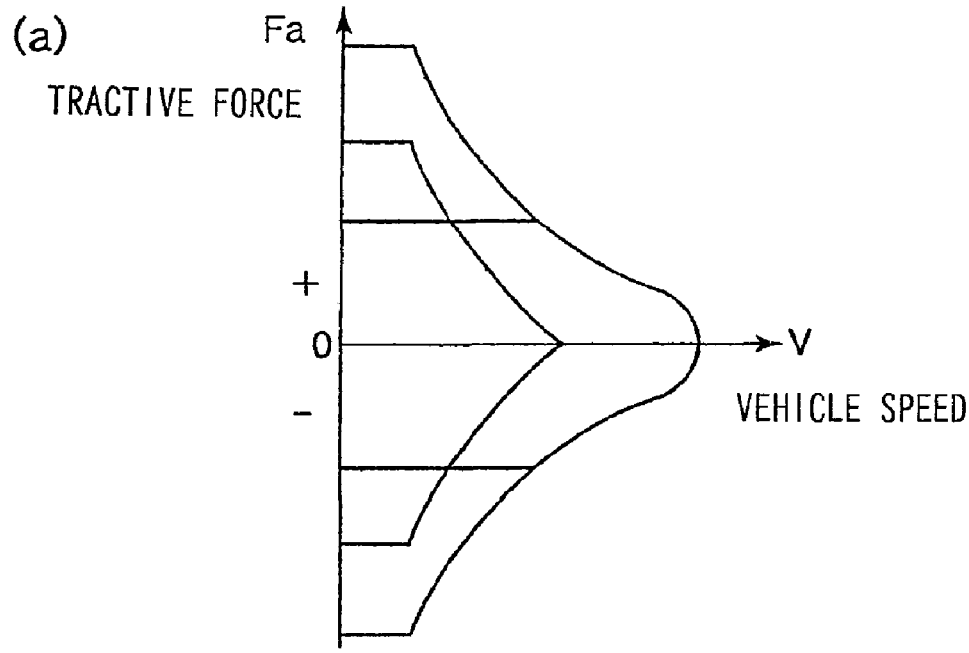
FIGS. 9(a) to 9(b) show characteristics of the overall tractive force by the vehicle, the tractive force by the HST drive device, and the tractive force by the electric motor, respectively, which are obtained by the travel drive system in accordance with the second embodiment.
Figure 9:
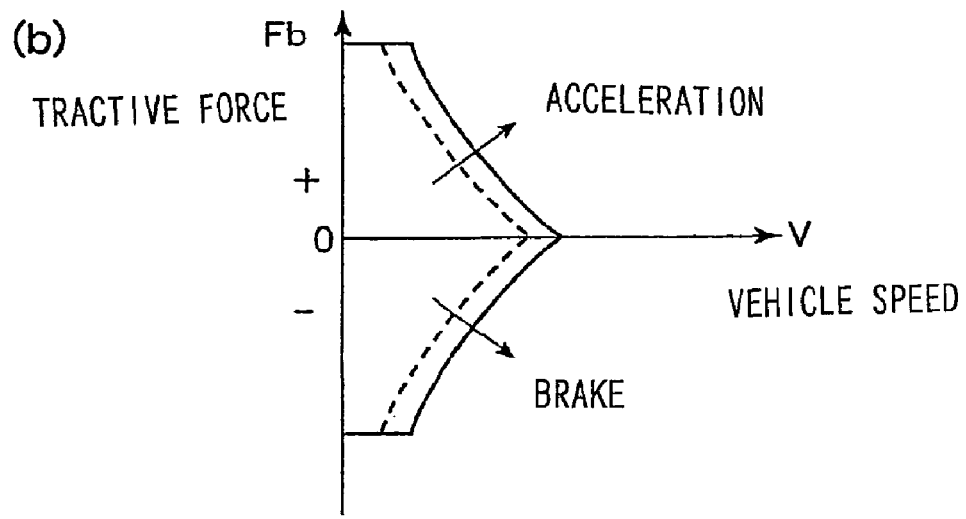
Figure 9:
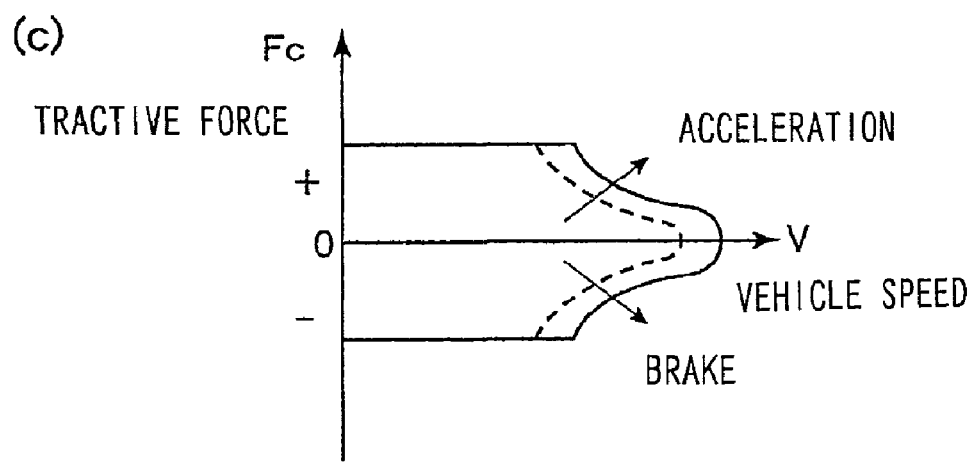

The travel drive system in accordance with the second embodiment of the present invention is now explained in reference to FIGS. 8 and 9.

According to the second embodiment, a generator motor is provided in place of the electric motor 23 as the rear-wheel drive device 20. Kinetic energy of the vehicle is recovered during low-speed running. FIG. 8 is a schematic diagram of the travel drive system in accordance with the second embodiment. The same reference numbers are assigned to the same items in common with FIG. 2. Explanations in below is focused on the differences.

The controller 50 is connected with the vehicle speed detector 51, the operation amount detector 52 for accelerator pedal, and an operation amount detector 57 for detecting an operation amount B of a brake pedal. The controller 50 subtracts the operation amount B of the operation amount detector 57 from the operation amount A of the operation amount detector 52. The controller 50 outputs an acceleration instruction when the subtraction value is positive, while the controller 50 outputs an deceleration instruction when the subtraction value is negative. When the acceleration instruction is output, the generator motor 55 functions as an electric motor. When the deceleration instruction is output, on the other hand, the generator motor 55 functions as a generator. A pump for working is coupled to an engine output shaft of the wheel loader. The accelerator pedal is operated for adjusting horsepower during a work operation. Therefore, in a work vehicle such as the wheel loader, the accelerator pedal and the brake pedal are often operated simultaneously.

When the generator motor 55 functions as an electric motor, the generator motor 55 is driven by drive current supplied to the generator motor 55 via an inverter/converter 56 in response to a control signal from the controller 50. In this respect, similarly to the first embodiment, when the brake pedal is not operated, for example, the power Pw2 of the generator motor 55 changes in response to the operation amount A of the accelerator pedal and the vehicle speed v as shown in FIG. 6. When the generator motor 55 functions as a generator, electric power generated by the generator motor 55 is charged in the battery 22 through the inverter/converter 56.

FIGS. 9(a) through 9(c) show the relationship between the vehicle speed v and the tractive force F in accordance with the second embodiment, corresponding to FIGS. 5(a) through 5(c) in the first embodiment. In response to the deceleration instruction (brake instruction) output while the vehicle is moving, the generator motor 55 acts as a generator so that the tractive force Fc becomes negative and brake force is applied on the vehicle. This allows kinetic energy during deceleration to be recovered in the battery 22. Hereat, as the deceleration instruction value becomes larger, the generated electricity increases and the brake force increases. As the vehicle speed v is low, a hydraulic brake by the HST operates at the same time. In this case, a brake by the generator motor 55 operates first, then the hydraulic brake by the HST operates additionally so as to complement the braking force. By this means, the generator motor 55 preferentially generates electricity for efficient kinetic energy recovery.

According to the second embodiment, the generator motor 55 drives the rear wheels 123 and generates electricity during deceleration so as to allow unnecessary kinetic energy to be recovered during deceleration for improvement in fuel efficiency. The operation amount A of the accelerator pedal and the operation amount B of the brake pedal are detected so as to determine the deceleration instruction by the difference between A and B. As the deceleration instruction value becomes larger, the generator motor 55 generates more electricity and the brake force increases. Therefore, appropriate brake force is applied on the vehicle.

According to the above-mentioned embodiment, the brake force is applied on the vehicle by using the motor generator 55 as a generator. However, a mechanical brake, with which brake force is applied by driving a brake disc, maybe combined. While a method with which the controller 50 determines an acceleration/deceleration instruction by the difference between the operation amount A of the accelerator pedal and the operation amount B of the brake pedal, a determination unit is not limited to the one shown above.

While the HST hydraulic circuit is configured so as to mechanically modify the pump displacement angle qp and the motor displacement angle qm of the HST travel drive system, the displacement angles qp and qm may be directly electronically-controlled. While the HST drives the front wheels 113 as the first drive wheels, and the electric motor 23 drives the rear wheels 123 as the second drive wheels, the electric motor 23 may drive the front wheels 113 and the HST may drive the rear wheels 123. Configuration of drive system for the wheels 113 and 123 is not limited to the one shown above. While the operation amount detector 52 is used for detecting the operation amount A of the accelerator pedal, another acceleration detector may be employed.

The power Pw1 (the first power) of the HST is larger than the Pw2 (the second power) and stays constant in a low speed range in which the vehicle speed v detected by the vehicle speed detector 51 is equal to or smaller than va (the first predetermined value). The Pw1 gradually decreases while the Pw2 gradually increases in a medium speed range of va<v<vb (the second predetermined value). The Pw1 is 0 while the Pw2 is maximum (Pw0) in a high speed range of v>vb (FIG. 6). However, configuration of the controller 50 as a control unit is not limited to the one shown above as long as engine output is distributed to the HST and the electric motor 23 such that, as the vehicle speed v increases, the proportion of the power to be distributed to the HST decreases while the proportion of the power to be distributed to the electric motor 23 increases. Consequently, the characteristics of the tractive force Fa to Fc is not limited to the one shown in FIGS. 5 and 9. Configuration of the controller 50 as a torque control unit is not limited to the one shown above as long as the output torque T of the electric motor 23 is controlled such that the vehicle speed v2 when the tractive force Fb is 0 is equal to the vehicle speed v2 when the tractive force Fc starts decreasing.

Although the embodiments described above have been adopted in a wheel loader, the present invention may also be adopted in other work vehicles (a wheel hydraulic excavator and the like) with respect to preferred embodiments. The present invention is not limited to the travel drive system in accordance with the embodiments insofar as feature and function of the present invention are realized.

The disclosure of the following priority application is herein incorporated by reference: Japanese Patent Application No. 2006-326694 filed Dec. 4, 2006.

The invention claimed is:

1. A travel drive system for a work vehicle, comprising:
   a hydrostatic transmission (HST) drive device comprising a hydraulic pump driven by a prime mover and a hydraulic motor connected to the hydraulic pump by a closed circuit;
   an electric motor driven by using electric power generated by drive of the prime mover;
   a first drive wheel driven by the HST drive device;
   a second drive wheel driven by the electric motor;
   a vehicle speed detector that detects a vehicle speed; and
   a control unit that distributes output of the prime mover to the HST drive device and to the electric motor such that, as the vehicle speed detected by the vehicle speed detector increases, a proportion of a first power distributed to the HST drive device decreases and a proportion of a second power distributed to the electric motor increases.

2. A travel drive system for a work vehicle, comprising:
   a hydrostatic transmission (HST) drive device comprising a hydraulic pump driven by a prime mover and a hydraulic motor connected to the hydraulic pump by a closed circuit;
   a motor generator that functions as an electric motor when driven by using electric power generated by drive of the prime mover and that functions as a generator when driven by kinetic energy during traveling;
   a first drive wheel driven by the HST drive device;
   a second drive wheel driven by the motor generator;
   a vehicle speed detector that detects a vehicle speed;
   a determination unit that determines output of an acceleration/deceleration instruction for the vehicle; and
   a control unit that, when it is determined with the determination unit that an acceleration instruction is output, allows the motor generator to function as an electric motor and distributes output of the prime mover to the HST drive device and the electric motor such that, as the vehicle speed detected by the vehicle speed detector increases, a proportion of a first power distributed to the HST drive device decreases while a proportion of a second power distributed to the motor generator increases, wherein
   the control unit, when it is determined with the determination unit that a deceleration instruction is output, allows the motor generator to function as a generator.

3. A travel drive system of a work vehicle according to claim 2, wherein:
   when it is determined with the determination unit that the deceleration instruction is output, the control unit controls the motor generator to generate more electricity as a deceleration instruction value is larger.

4. A travel drive system of a work vehicle according to claim 1, further comprising:
   an acceleration detector that detects an acceleration instruction value, wherein:
   the control unit distributes power of the prime mover to the HST drive device and the electric motor such that, as the acceleration instruction value is larger, the first power and the second power increase.

5. A travel drive system of a work vehicle according to claim 1, wherein:
   the first drive wheel is a front wheel, and the second drive wheel is a rear wheel.

6. A travel drive system of a work vehicle according to claim 1, wherein:
   the control unit controls the proportion of the first power to be constant and larger than the proportion of the second power in a range where the vehicle speed detected by the vehicle speed detector is equal to a first predetermined value or less;
   the control unit gradually decreases the proportion of the first power in a range where the vehicle speed detected by the vehicle speed detector is more than the first predetermined value and less than a second predetermined value which is larger than the first predetermined value; and
   the control unit sets the proportion of the first power to be zero in a range where the vehicle speed detected by the vehicle speed detection section is equal to the second predetermined value or more.

7. A travel drive system of a work vehicle according to claim 1, further comprising:
   a gearing system that transmits power by the HST drive device to the first drive wheel.

8. A travel drive system of a work vehicle according to claim 1, wherein:

the control unit comprises a torque control unit that maintains output torque of the electric motor constant until tractive force by the HST drive device is reduced to zero and controls output torque of the electric motor such that tractive force by the electric motor starts decreasing after the tractive force by the HST drive device is reduced to zero by an increase in the vehicle speed.

9. A work vehicle that comprises a travel drive system according to claim 1.

10. A travel drive method for a work vehicle, including a hydrostatic transmission (HST) drive device comprising a hydraulic pump driven by a prime mover and a hydraulic motor connected thereto by a closed circuit, comprising:
   driving a first wheel by the HST drive device;
   driving a second wheel by an electric motor; and,
   as a vehicle speed increases, decreasing a proportion of a first power to be distributed to the HST drive device, while increasing a proportion of a second power to be distributed to the electric motor.

11. A travel drive system of a work vehicle according to claim 2, further comprising:
   an acceleration detector that detects an acceleration instruction value, wherein:
   the control unit distributes power of the prime mover to the HST drive device and the electric motor such that, as the acceleration instruction value is larger, the first power and the second power increase.

12. A travel drive system of a work vehicle according to claim 2, wherein:
   the first drive wheel is a front wheel, and the second drive wheel is a rear wheel.

13. A travel drive system of a work vehicle according to claim 2, wherein:
   the control unit controls the proportion of the first power to be constant and larger than the proportion of the second power in a range where the vehicle speed detected by the vehicle speed detector is equal to a first predetermined value or less;
   the control unit gradually decreases the proportion of the first power in a range where the vehicle speed detected by the vehicle speed detector is more than the first predetermined vallue and less than a second predetermined value which is larger than the first predetermined value; and
   the control unit sets the proportion of the first power to be zero in a range where the vehicle speed detected by the vehicle speed detection section is equal to the second predetermined value or more.

14. A travel drive system of a work vehicle according to claim 2, further comprising:
   a gearing system that transmits power by the HST drive device to the first drive wheel.

15. A travel drive system of a work vehicle according to claim 2, wherein:
   the control unit comprises a torque control unit that maintains output torque of the electric motor constant until tractive force by the HST drive device is reduced to zero and controls output torque of the electric motor such that tractive force by the electric motor starts decreasing after the tractive force by the HST drive device is reduced to zero by an increase in the vehicle speed.

16. A work vehicle that comprises a travel drive system according to claim 2.

* * * * *